(12) United States Patent
 Zhang et al.

(10) Patent No.: US 12,111,553 B2
(45) Date of Patent: Oct. 8, 2024

(54) ARRAY SUBSTRATE AND DISPLAY PANEL (71) Applicant: Wuhan China Star Optoelectronics Technology Co., Ltd., Hubei (CN)

(72) Inventors: Hua Zhang, Hubei (CN); Xindong Mei, Hubei (CN); Chao Wang, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/788,312

(22) PCT Filed: Jun. 2, 2022

(86) PCT No.: PCT/CN2022/096868
§ 371 (c)(1),
(2) Date: Jun. 23, 2022

(87) PCT Pub. No.: WO2023/226075
PCT Pub. Date: Nov. 30, 2023

(65) Prior Publication Data
US 2024/0168350 A1  May 23, 2024

(30) Foreign Application Priority Data
May 25, 2022  (CN) .......................... 202210583423.5

(51) Int. Cl.
*G02F 1/1343* (2006.01)
*G02F 1/1333* (2006.01)
(Continued)

(52) U.S. Cl.
CPC ...... *G02F 1/1368* (2013.01); *G02F 1/133357* (2021.01); *G02F 1/13338* (2013.01);
(Continued)

(58) Field of Classification Search
None
See application file for complete search history.

(56) References Cited

U.S. PATENT DOCUMENTS

2012/0086654 A1*  4/2012  Song ............... G06F 3/0412
                                                         345/173
2018/0108786 A1    4/2018  Xu
(Continued)

FOREIGN PATENT DOCUMENTS

CN    104881170    *  9/2015    ........... G02F 1/1343
CN    106855674       6/2017
(Continued)

OTHER PUBLICATIONS

Notification of Office Action and Search Report Dated Apr. 19, 2023 From the State Intellectual Property Office of the People's Republic of China Re. Application No. 202210583423.5 and Its Translation Into English. (19 Pages).
(Continued)

*Primary Examiner* — Sang V Nguyen (57) ABSTRACT

The present application discloses an array substrate and a display panel. The array substrate includes a substrate, a light-shielding layer, a touch trace, and a data line. The light-shielding layer is disposed on the substrate. The touch trace is disposed on the substrate. The data line and the touch trace are disposed on different layers, and at least one of the data line and the touch trace is disposed on a same layer as the light-shielding layer. An orthographic projection of the data line on the substrate at least partially covers an orthographic projection of the touch trace on the substrate. The orthographic projection of the data line on the substrate and the orthographic projection of the touch trace on the substrate are staggered.

20 Claims, 10 Drawing Sheets

(51) Int. Cl.
  *G02F 1/1362* (2006.01)
  *G02F 1/1368* (2006.01)

(52) U.S. Cl.
  CPC .. *G02F 1/134363* (2013.01); *G02F 1/136209* (2013.01); *G02F 1/136227* (2013.01); *G02F 1/136286* (2013.01)

(56) References Cited

U.S. PATENT DOCUMENTS

2019/0235294 A1* 8/2019 Wang .................... G06F 3/0443
2023/0314888 A1* 10/2023 Wang .................... G06F 3/0412
                                                        349/147
2024/0030240 A1* 1/2024 Luo ..................... H01L 29/7869

FOREIGN PATENT DOCUMENTS

| CN | 107015410 | * | 8/2017 | ........... G02F 1/1362 |
| CN | 107085487 | | 8/2017 | |
| CN | 107490906 | | 12/2017 | |
| CN | 108227326 | | 6/2018 | |
| CN | 108319397 | * | 7/2018 | ............. G06F 3/044 |
| CN | 110349976 | | 10/2019 | |
| CN | 114141881 | | 3/2022 | |
| CN | 216052544 | | 3/2022 | |
| WO | WO 2021/258531 | | 12/2021 | |

OTHER PUBLICATIONS

International Search Report and the Written Opinion Dated Dec. 20, 2022 From the International Searching Authority Re. Application No. PCT/CN2022/096868 and Its Translation Into English. (15 Pages).

* cited by examiner

ARRAY SUBSTRATE AND DISPLAY PANEL

RELATED APPLICATIONS

This application is a National Phase of PCT Patent Application No. PCT/CN2022/096868 having International filing date of Jun. 2, 2022, which claims the benefit of priority of Chinese Patent Application No. 202210583423.5 filed on May 25, 2022. The contents of the above applications are all incorporated by reference as if fully set forth herein in their entirety.

FIELD AND BACKGROUND OF THE INVENTION

The present application relates to a field of display technology, and in particular, to an array substrate and a display panel.

With rapid development of display technology, touch display panels have been widely used, such as in smartphones, tablets and the like. An embedded touch display panel with high integration and thin thickness has advantages of low cost, ultra-thin, and narrow bezel, and has evolved into main development of a future touch technology.

In order to further optimize display effect of the touch display panel, and to satisfy the consumer, an effective way to improve the luminance efficiency is to increase an aperture ratio in the panel.

Therefore, providing an array substrate and a display panel to increase the pixel aperture ratio becomes an urgent technical problem to be solved.

Embodiments of the present application provide an array substrate and a display panel for increasing a pixel aperture ratio.

SUMMARY OF THE INVENTION

Embodiments of the present application provide an array substrate, wherein the array substrate comprises:
  a substrate;
  a light-shielding layer disposed on the substrate;
  a touch trace disposed on the substrate; and
  a data line, wherein the data line and the touch trace are disposed on different layers, and at least one of the data line and the touch trace is disposed on a same layer as the light-shielding layer, wherein an orthographic projection of the data line on the substrate partially covers an orthographic projection of the touch trace on the substrate, and the orthographic projection of the data line on the substrate and the orthographic projection of the touch trace on the substrate are partially staggered.

Optionally, in some embodiments provided by the present application, the touch trace is located aside the light-shielding layer, and the light-shielding layer and the touch trace are spaced apart.

Optionally, in some embodiments provided by the present application, the touch trace is located aside the light-shielding layer, and the light-shielding layer and the touch trace are connected to each other.

Optionally, in some embodiments provided by the present application, a distance between the data line and the touch trace is greater than or equal to 1 μm at a position where the data line is staggered from the touch trace.

Optionally, in some embodiments provided by the present application, the array substrate comprises a first via hole and a second via hole, and a width of an aperture of the first via hole is smaller than a width of an aperture of the second via hole.

Optionally, in some embodiments provided by the present application, the array substrate further includes:
  a thin film transistor structure layer including a thin film transistor and the data line, wherein the thin film transistor is disposed on the substrate, and the light-shielding layer shields the thin film transistor;
  a planarization layer disposed on a side of the thin film transistor structure layer away from the substrate;
  a first electrode disposed on a side of the planarization layer away from the substrate; and
  a connection electrode, wherein the first electrode is connected to the touch trace through the connection electrode.

Optionally, in some embodiments provided by the present application, the array substrate further comprises a third via hole, the first electrode is disposed on the planarization layer, the thin film transistor includes a source electrode and a drain electrode, wherein the source electrode and the drain electrode are disposed on a same layer as the data line, and the array substrate further comprises:
  a passivation layer disposed on a side of the first electrode away from the thin film transistor structure layer, wherein the first via hole penetrates through the passivation layer and the planarization layer; the second via hole penetrates through the passivation layer, the planarization layer, and an insulating layer of the thin film transistor structure layer; and the third via hole penetrates through the passivation layer; wherein the connection electrode is disposed on the passivation layer and extends into the second via hole and the third via hole, an end of the connection electrode is connected to the touch trace, and another end of the connection electrode is connected to the first electrode; and
  a second electrode disposed on the passivation layer, wherein the connection layer is disposed on a same layer as the second electrode, and the second electrode is connected to the drain electrode through the first via hole.

Optionally, in some embodiments provided by the present application, the thin film transistor comprises a source electrode and a drain electrode disposed on a same layer as the data line, and the array substrate further comprises:
  a second electrode disposed on a side of the planarization layer away from the thin film transistor structure layer, wherein the second electrode is connected to the drain electrode through the first via hole; and
  a passivation layer disposed on the second electrode, wherein the first electrode is disposed on the passivation layer; the first via hole penetrates through the planarization layer; the second via hole penetrates through the passivation layer, the planarization layer, and an insulating layer of the thin film transistor structure layer; the connection electrode is disposed in the second via hole; and the connection electrode is configured to connect the first electrode with the touch trace.

Optionally, in some embodiments provided by the present application, the first electrode has a slit.

Optionally, in some embodiments provided by the present application, the data line includes a first trace segment and a second trace segment connected to each other, the first trace segment corresponds between two adjacent sub-pixels, the second trace segment corresponds to the thin film transistor; wherein an orthographic projection of the first trace segment on the substrate partially covers an orthographic projection of the touch trace on the substrate, and an orthographic projection of the second trace segment on the substrate is staggered from an orthographic projection of the touch trace on the substrate at least corresponding to the second via hole.

Optionally, in some embodiments provided by the present application, the thin film transistor further comprises an active layer, and the orthographic projection of the second trace segment on the substrate partially covers an orthographic projection of the active layer on the substrate.

Optionally, in some embodiments provided by the present application, the thin film transistor further comprises a gate electrode, and the thin film transistor structure layer further comprises:
 a barrier layer disposed on the light-shielding layer and covering the light-shielding layer and the touch trace, wherein the active layer is disposed on the barrier layer, and an orthographic projection of the active layer on the substrate is located in an orthographic projection of the light-shielding layer on the substrate;
 a gate insulating layer disposed on a side of the active layer away from the substrate, wherein the gate electrode is disposed on a side of the gate insulating layer away from the active layer; and
 an interlayer dielectric layer covering the gate electrode and the gate insulating layer, wherein the interlayer dielectric layer is provided with a first contact hole and a second contact hole; the source electrode, the drain electrode and the data line are disposed on the interlayer dielectric layer; the source electrode is connected to the active layer through the first contact layer; and the drain electrode is connected to the active layer through the second contact hole.

Optionally, in some embodiments provided by the present application, the first electrode is a common electrode, and the first electrode is multiplexed as a touch electrode.

Optionally, in some embodiments provided by the present application, a material of the light-shielding layer is same as a material of the touch trace.

Optionally, embodiments of the present application further provide a display panel including the above array substrate, wherein the display panel further includes:
 a color film substrate provided on the array substrate; and
 a liquid crystal layer disposed between the array substrate and the color film substrate.

Optionally, in some embodiments provided by the present application, the touch trace is located aside the light-shielding layer, and the light-shielding layer and the touch trace are spaced apart.

Optionally, in some embodiments provided by the present application, the touch trace is located aside the light-shielding layer, and the light-shielding layer and the touch trace are connected to each other.

Optionally, in some embodiments provided by the present application, a distance between the data line and the touch trace is greater than or equal to 1 µm at a position where the data line is staggered from the touch trace.

Optionally, in some embodiments provided by the present application, the array substrate includes a first via hole and a second via hole, and a width of an aperture of the first via hole is smaller than a width of an aperture of the second via hole.

Optionally, in some embodiments provided by the present application, the color film substrate comprises a plurality of black matrixes and a plurality of color blocking blocks, wherein each of the blocking blocks is disposed between adjacent of the black matrixes, wherein an orthographic projection of the black matrix on the substrate covers orthographic projections of the touch trace and the light-shielding layer on the substrate.

Embodiments of the present application provide an array substrate and a display panel. The array substrate includes a substrate, a light-shielding layer, a touch trace, and a data line. The light-shielding layer is disposed on the substrate. The touch trace is disposed on the substrate. The data line and the touch trace are disposed on different layers, and at least one of the data line and the touch trace is disposed on a same layer as the light-shielding layer. An orthographic projection of the data line on the substrate at least partially covers an orthographic projection of the touch trace on the substrate. The orthographic projection of the data line on the substrate and the orthographic projection of the touch trace on the substrate are staggered. In the array substrate provided by the present application, the light-shielding layer and the touch trace are disposed on a same layer, and the orthographic projection of the data line on the substrate at least partially covers the orthographic projection of the touch trace on the substrate, which reduces or even eliminates the influence of the touch trace on the pixel aperture ratio, increases the pixel aperture ratio, and further improves the pixel penetration ratio.

BRIEF DESCRIPTION OF THE SEVERAL VIEWS OF THE DRAWINGS

In order to more clearly describe the technical solutions in the embodiments of the present application, the accompanying drawings required in the description of the embodiments will be briefly described below. It is obvious that the accompanying drawings in the following description are merely some embodiments of the present application, and other drawings may be obtained by those skilled in the art without creative efforts.

DESCRIPTION OF SPECIFIC EMBODIMENTS OF THE INVENTION

In order to make the subjects, technical solutions and advantages of the present application clearer, the present application will be further described in detail with reference to the accompanying drawings, in which the same components are denoted by the same reference numerals. The following description is based on the specific embodiments of the present application, which shall not be construed as limiting other specific embodiments of the present application undescribed in detail herein. The term "embodiment" as used in this specification means an example, exemplary, or exemplarily.

In the description of the present application, it should be understood that the directions or positional relationships indicated by the terms "center", "longitudinal", "lateral", "length", "width", "thickness", "up", "down", "front", "rear", "left", "right", "vertical", "horizontal", "top", "bottom", "inner", "outer", "clockwise", "counterclockwise" and the like are based on the drawings, and are merely intended to facilitate the description of the present application and to simplify the description, and are not intended to indicate or imply that the device or element must have a particular direction, be constructed or operated in a particular direction, and therefore cannot be construed as limiting the present application. The terms "first" and "second" are used merely for description, rather than indicating or implying a relative importance or the number of the features. The features defining with "first" and "second" may explicitly or implicitly include one or more. In the description of the present application, the term "plurality" means two or more than two, unless otherwise specifically defined.

Embodiments of the present application provide an array substrate and a display panel. The following is a detailed description of each. It should be noted that the order of description of the following embodiments is not a limitation on the preferred order of the embodiments.

Embodiments of the present application provide an array substrate including a substrate, a light-shielding layer, a touch trace, and a data line. The light-shielding layer is disposed on the substrate. The touch trace is disposed on the substrate. The data line and the touch trace are disposed on different layers, and at least one of the data line and the touch trace is disposed on a same layer as the light-shielding layer. An orthographic projection of the data line on the substrate covers an orthographic projection of the touch trace on the substrate, and the orthographic projection of the data line on the substrate and the orthographic projection of the touch trace on the substrate are staggered. In the array substrate provided by the present application, the light-shielding layer and the touch trace are disposed on a same layer, so that the touch trace does not need to be disposed on other film layer structures, and the orthographic projection of the data line on the substrate at least partially covers the orthographic projection of the touch trace on the substrate, which reduces or even eliminates the influence of the touch trace on the pixel aperture ratio, thereby increasing the pixel aperture ratio, and further improving the pixel penetration ratio.

Figure 1:
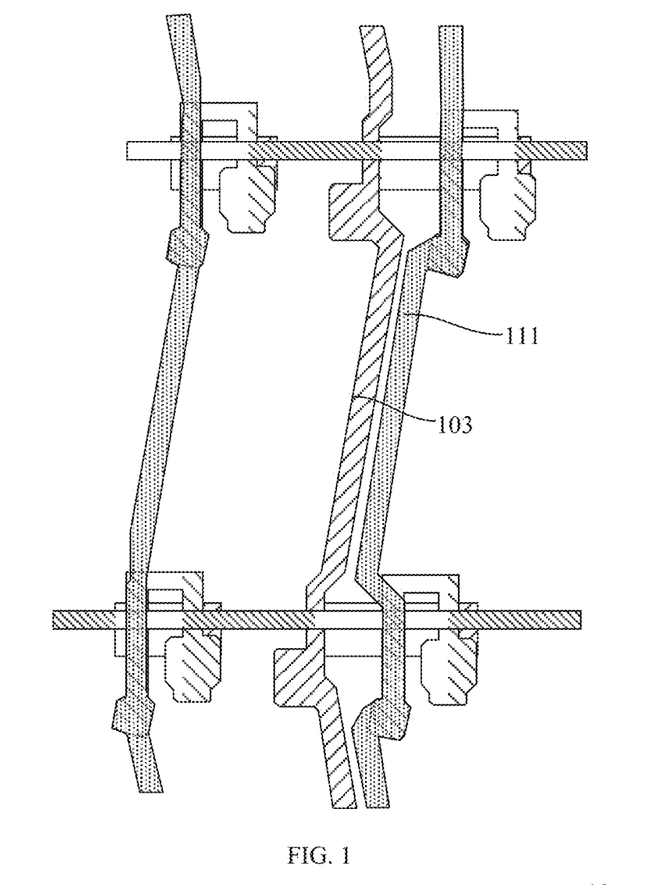
FIG. 1 is a schematic diagram of a planar structure of an array substrate according to a comparative embodiment of the present application.

The array substrate provided in this application will be described in detail by way of specific embodiments. FIG. 1 is a schematic plan diagram of an array substrate according to a comparative embodiment of the present application. As shown in FIG. 1, the touch trace 103 and the data line 111 are staggered. The touch trace 103 and the data line 111 are metal traces. Since the touch trace 103 and the data line 111 are staggered, they both occupy an aperture area of a pixel, resulting in a low pixel aperture ratio.

Figure 2:
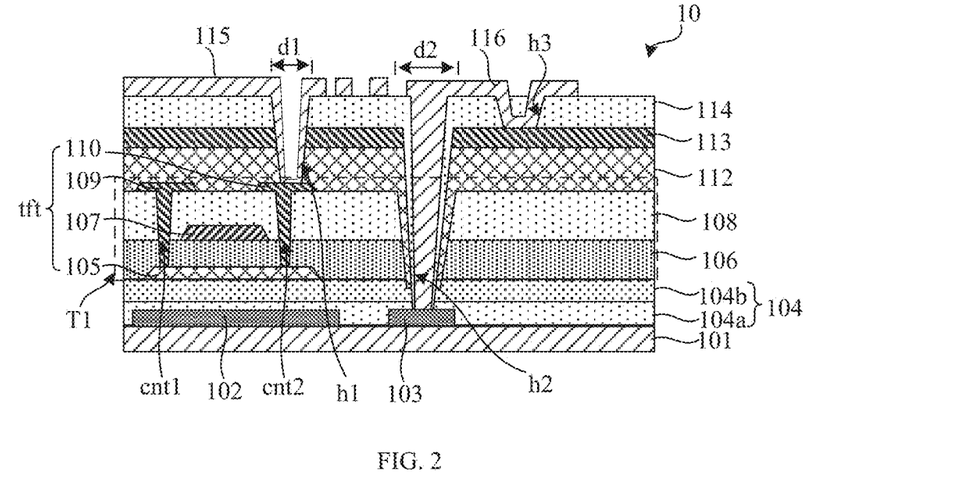
FIG. 2 is a first schematic structural diagram of an array substrate according to an embodiment of the present application.
Figure 3:
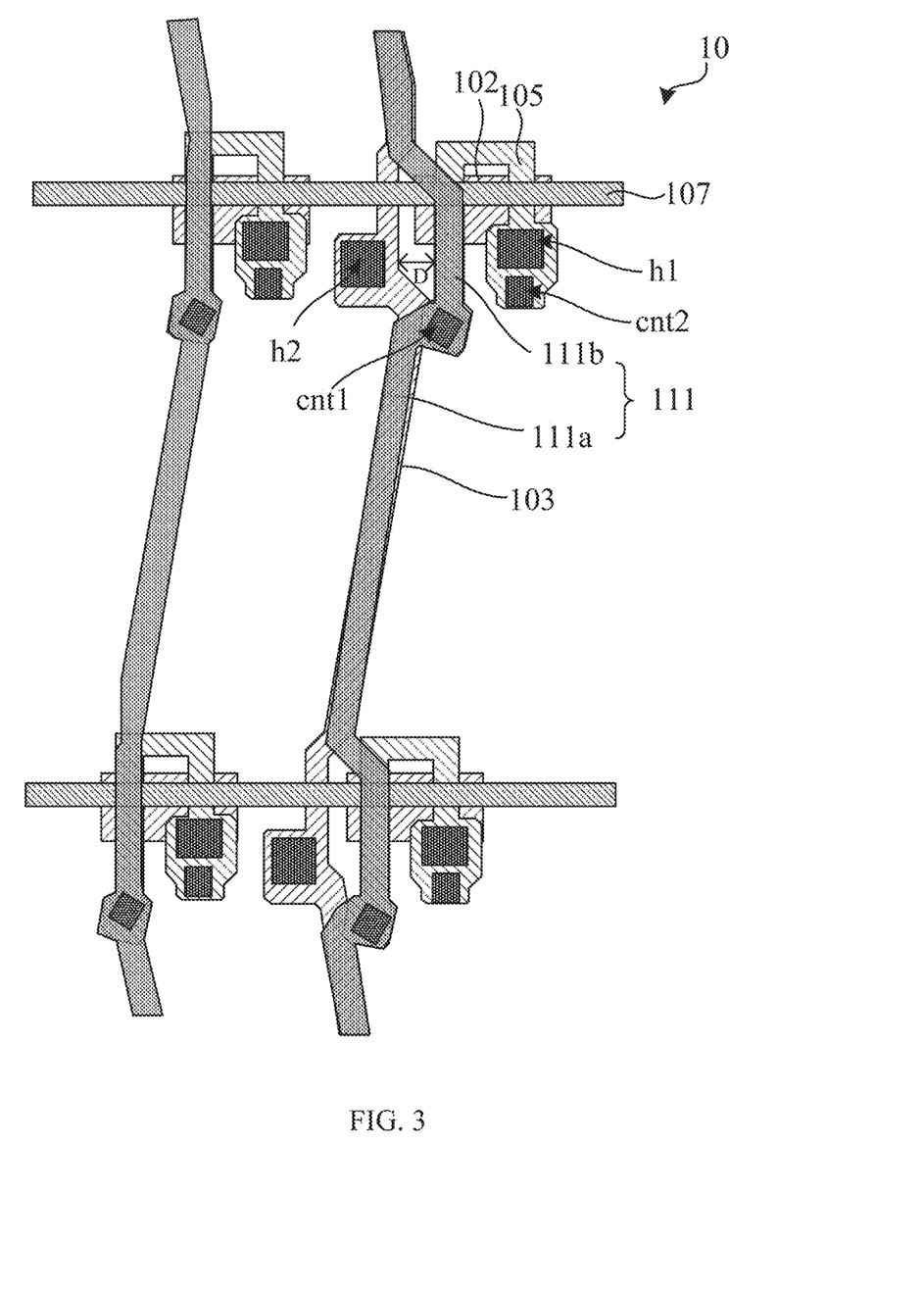
FIG. 3 is a schematic diagram of a first planar structure of an array substrate according to an embodiment of the present application.
Figure 4:
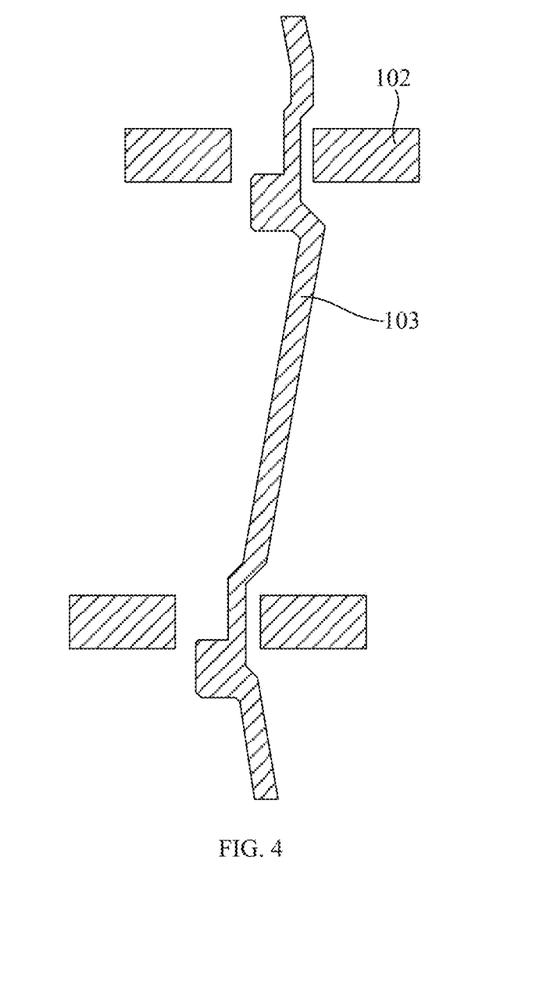
FIGS. 4, 5, 6, 7 and 8 are schematic diagrams of planar structures of partial film layers of array substrates according to embodiments of the present application.
Figure 5:
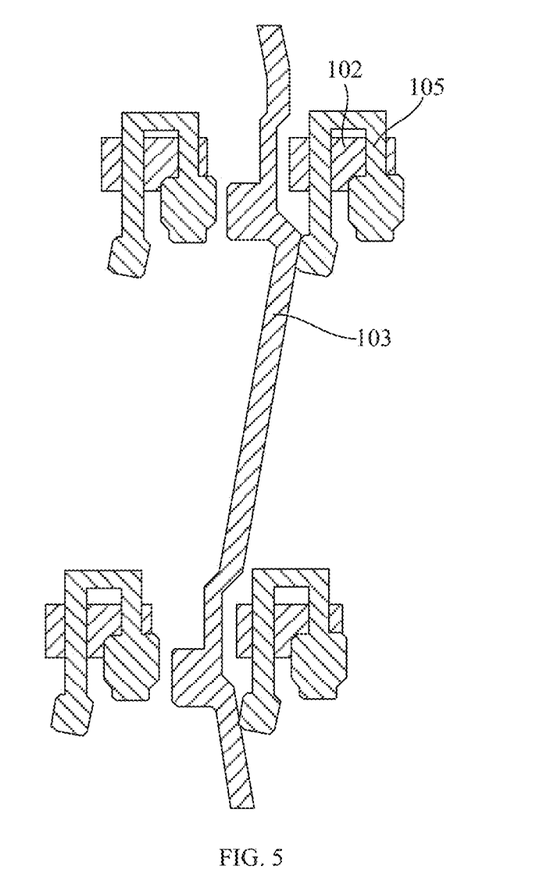
Figure 6:
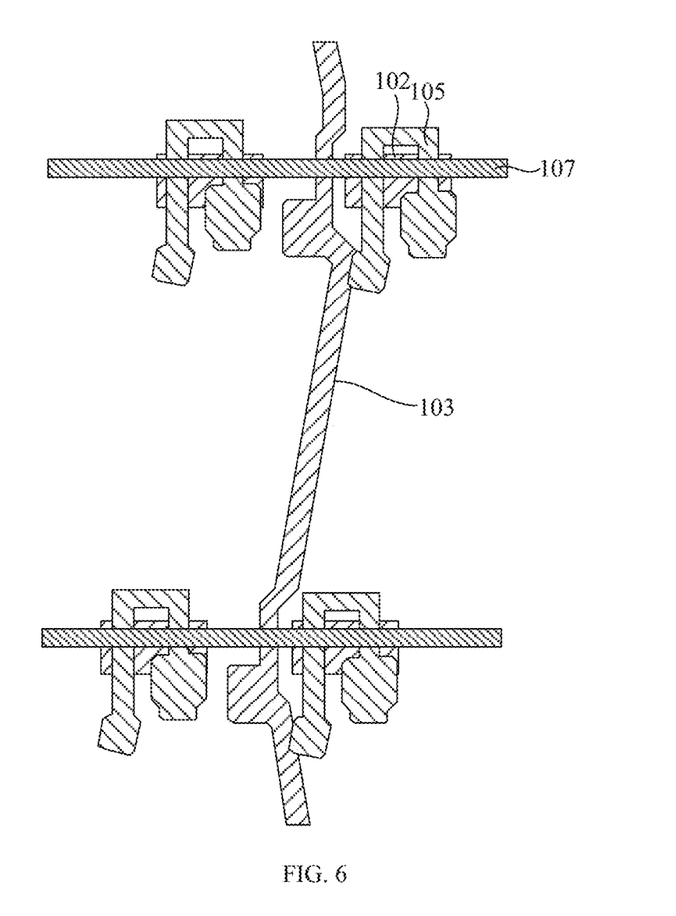
Figure 7:
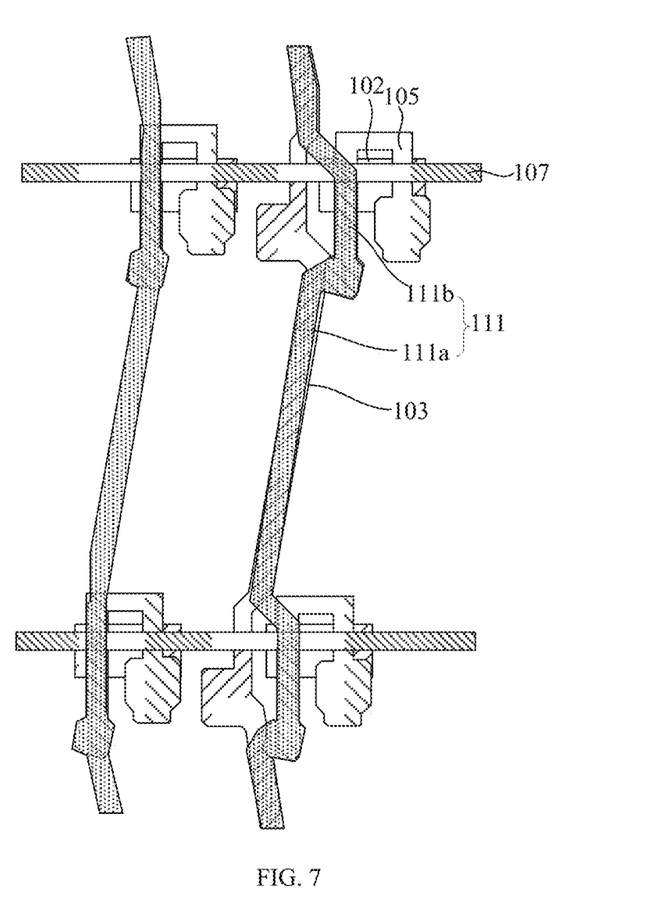
Figure 8:
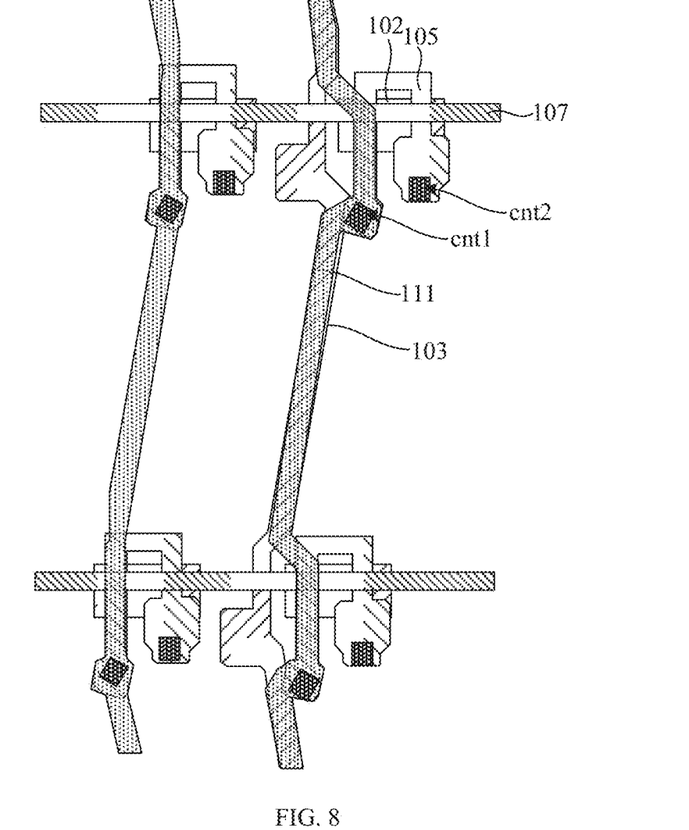

An embodiment of the present application provides an array substrate. References are made to FIG. 2 and FIG. 3, wherein FIG. 2 is a first schematic structural diagram of an array substrate according to the embodiment of the present application, and FIG. 3 is a schematic diagram of a first planar structure of an array substrate according to an embodiment of the present application. The array substrate 10 includes a substrate 101, a light-shielding layer 102, a touch trace 103, and a data line 111. The light-shielding layer 102 is disposed on the substrate 101. The touch trace 103 is disposed on the substrate 101 and on a same layer as the light-shielding layer 102. The data line 111 and the touch trace 103 are disposed on different layers. The orthographic projection of the data line 111 on the substrate 101 partially covers the orthographic projection of the touch trace 103 on the substrate 101. The orthographic projection of the data line 111 on the substrate 101 and the orthographic projection of the touch trace 103 on the substrate 101 are staggered. In the array substrate 10 provided by the present application, the light-shielding layer 102 and the touch trace 103 are disposed on a same layer. Therefore, there is no need to provide the touch trace 103 on another film layer structure, and the orthographic projection of the data line 111 on the substrate 101 partly covers the orthographic projection of the touch trace 103 on the substrate 101, so that the influence of the touch trace 103 on the aperture ratio is eliminated, the pixel aperture ratio is increased, and the pixel penetration ratio is improved.

It should be understood that, in the embodiment of the present application, the aperture ratio refers to a ratio between an area of the light passing portion with removing the wiring portion and the transistor (usually hidden by a black matrix) of each sub-pixel and a whole area of each sub-pixel.

In some embodiments, the data line 111 and the touch trace 103 are disposed on different layers, and the data line 111 and the light-shielding layer 102 are disposed on a same layer.

Referring to FIG. 2, the array substrate 10 includes a first via hole h1, a second via hole h2, and a third via hole h3, wherein a width d1 of an aperture of the first via hole h1 is smaller than a width d2 of an aperture of the second via hole h2.

The array substrate 10 further includes a thin film transistor structure layer T1, a planarization layer 112, a first electrode 113, a connection electrode 116, a passivation layer 114, and a second electrode 115.

The thin film transistor structure layer T1 is disposed on a side of the light-shielding layer 102 away from the substrate 101. The thin film transistor structure layer T1 includes a thin film transistor tft and a data line 111. The thin film transistor tft includes an active layer 105, a gate electrode 107, and a source electrode 109 and a drain electrode 110 disposed on the same layer as the data line 111.

The first via hole h1 penetrates the passivation layer 114 and the planarization layer 112. The second via hole h2 penetrates the passivation layer 114, the planarization layer 112, and an insulating layer of the thin film transistor structure layer T1. The third via hole h3 penetrates the passivation layer 114. The planarization layer 112 is disposed on a side of the thin film transistor structure layer T1 away from the substrate 101. The first electrode 113 is disposed on a side of the planarization layer 112 away from the substrate 101. The first electrode 113 is connected to the touch trace 103 through the second via hole h2 and the third via hole h3, and the touch trace 103 serves to provide a touch signal to the first electrode 113. The passivation layer 114 is disposed on a side of the first electrode 113 away from the thin film transistor structure layer T1. The second electrode 115 is disposed on the passivation layer 114, and the second electrode 115 is connected to the drain electrode 110 through the first via hole h1. The connection electrode 116 is disposed on the passivation layer 114, and the connection electrode 116 is disposed on a same layer as the second electrode 115. The connection electrode 116 extends into the second via hole h2 and the third via hole h3. An end of the connection electrode 116 is connected to the touch trace 103, and the other end of the connection electrode 116 is connected to the first electrode 113.

In the embodiment of the present application, the second electrode 115 and the connection electrode 116 are disposed on a same layer, and the first electrode 113 and the connection electrode 116 can be formed at a same time through a same yellow process, thereby increasing a production efficiency of the array substrate 10.

In the present application, since the second via hole h2 penetrates through the passivation layer 114, the planarization layer 112, and an insulating layer of the thin film transistor structure layer T1, that is, the second via hole h2 penetrates through the insulating layers more than the first via hole h1. The width d1 of the aperture of the first via hole h1 is smaller than the width d2 of the aperture of the second via hole h2.

In some embodiments, the thin film transistor structure layer T1 further includes a barrier layer 104, a gate insulating layer 106, and an interlayer dielectric layer 108. The barrier layer 104 is disposed on the light-shielding layer 102, and covers the light-shielding layer 102 and the touch trace 103. The active layer 105 is disposed on the barrier layer 104, and the orthographic projection of the active layer 105 on the substrate 101 is in the orthographic projection of the light-shielding layer 102 on the substrate 101. The gate insulating layer 106 is disposed on a side of the active layer 105 away from the substrate 101. The gate electrode 107 is disposed on a side of the gate insulating layer 106 away from the active layer 105. The interlayer dielectric layer 108 covers the gate electrode 107 and the gate insulating layer 106. The interlayer dielectric layer 108 has a first contact hole cnt1 and a second contact hole cnt2. The source electrode 109, the drain electrode 110, and the data line 111 are disposed on the interlayer dielectric layer 108. The source electrode 109 is connected to the active layer 105 through the first contact hole cnt1, and the drain electrode 110 is connected to the active layer 105 through the second contact hole cnt2.

In some embodiments, the barrier layer 104 may include a first barrier layer 104a, and a second barrier layer 104b disposed on a side of the first barrier layer 104a away from the substrate 101. The first barrier layer 104a may be a silicon nitride barrier layer for blocking a diffusion of water and oxygen from the substrate 101, thereby avoid the thin film transistor structure layer T1 from damaging. The second barrier layer 104b is a silicon oxide barrier layer for hot insulating the active layer 105.

In some embodiments, the substrate 101 may be a glass substrate or a flexible substrate. The substrate 101 may further include a first flexible substrate layer, a silicon dioxide layer, a second flexible substrate layer, and a buffer layer that are stacked in sequence. Wherein a material of the second flexible substrate layer is same as a material of the first flexible substrate, and may include at least one of PI (polyimide), PET (polyethylene terephthalate), PEN (poly-ethylene naphthalate), PC (polycarbonate), PES (polyethersulfone), PAR (aromatic fluorotoluene containing polyaryl ester), or PCO (polycyclic olefin).

The active layer 105 may be a metal oxide active layer or a polysilicon active layer. The material of the gate insulating layer 106 and the interlayer dielectric layer 108 may be one of silicon nitride, silicon oxide, silicon oxynitride, or aluminum trioxide, or any combination thereof. The material of the gate electrode 107, the source electrode 109, the drain electrode 110, and the data line 111 may be a metal or an alloy such as Cr, W, Ti, Ta, Mo, Al, Cu, or the like, and a gate metal layer composed of a plurality of layers of metal can also satisfy the need. The material of the planarization layer 112 may be selected from silicon dioxide, nitrogen dioxide, silicon oxynitride and a stack thereof, or an organic material such as an acrylic resin. The material of the passivation layer 114 may be an inorganic non-metallic film layer material of SiOx, SiOx/SiNx stack or SiOx/SiNx/Al2O3 stack.

In the present application, one touch trace 103 corresponds to at least one thin film transistor. Therefore, one touch trace 103 may control the sub-pixel corresponding to the thin film transistor independently, or may control sub-pixels corresponding to at least two thin film transistors.

In the embodiment of the present application, the thin film transistor structure may be a bottom gate type, or may be a top gate type, or may be a double gate type. Embodiments of the present application take a top gate type as an example, but are not limited thereto.

References are made to FIG. 3, FIG. 4, FIG. 5, FIG. 6, FIG. 7, and FIG. 8, wherein FIG. 4 to FIG. 8 are schematic planar diagrams of partial film layers of an array substrate according to an embodiment of the present application. The thin film transistor tft is disposed on the substrate 101. The light-shielding layer 102 shields the thin film transistor tft. The touch trace 103 is located aside the light-shielding layer 102, and the light-shielding layer 102 and the touch trace 103 are spaced apart.

The light-shielding layer 102 and the touch trace 103 are provided in an insulating manner to prevent the touch signal of the touch trace 103 from affecting the stability of the array substrate.

In some embodiments, the material of the touch trace 103 is the same as the material of the light-shielding layer 102. For example, the material of the touch trace 103 and the light-shielding layer 102 may be at least one of chromium or molybdenum.

In some embodiments, a distance D between the data line 111 and the touch trace 103 is greater than or equal to 1 μm at a position where the data line 111 is staggered from the touch trace 103. In the embodiment of the present application, the distance D between the data line 111 and the touch trace 103 is set to be greater than or equal to 1 μm at a position where the data line 111 is staggered from the touch trace 103, to prevent the data line 111 and the touch trace 103 from being shorted due to the over-etching during the etching of the second via hole h2, thus, a risk of signal crosstalk is avoided. For example, the distance D between the data line 111 and the touch trace 103 may be any one of 1 μm, 1.1 μm, 1.25 μm, 1.4 μm, 1.55 μm, 1.8 μm, or 2.0 μm.

The data line 111 includes a first trace segment 111a and a second trace segment 111b connected to each other. The first trace segment 111a corresponds between two adjacent sub-pixels. The second trace segment 111b corresponds to the thin film transistor tft. An orthographic projection of the first trace segment 111a on the substrate 101 partially covers the orthographic projection of the touch trace 103 on the substrate 101. An orthographic projection of the second trace segment 111b on the substrate 101 and the orthographic projection of the touch trace 103 on the substrate 101 at least corresponding to the second via hole h2 are staggered. Since the second via hole h2 penetrates through a plurality of insulating layers and has a large hole diameter, the second via hole h2 need to formed by a plurality of etching process. The touch trace 103 and the second trace section 111b corresponding to the second via hole h2 are staggered so as to prevent the data line 111 and the touch trace 103 from being shorted due to the over-etching during the etching process, and the risk of signal crosstalk is avoided. Therefore, according to the embodiment of the present application, the touch trace 103 and the second trace section 111b corresponding to the second via hole h2 are staggered to keep clear from the second via hole h2 so as to avoid the risk of signal crosstalk from occurring.

In some embodiments, the orthographic projection of the second trace segment lib on the substrate 101 partially covers the orthographic projection of the active layer 105 on the substrate 101. In the present application, since the second trace segment lib and the active layer 105 partially overlap, the data line 111 blocks a part of the active layer 105 to prevent external lights from irradiating on the active layer 105, thereby avoiding the influence on the stability of the thin film transistor tft.

In the embodiment of the present application, the first electrode 113 is a common electrode, wherein the first electrode 113 is multiplexed as a touch electrode.

It should be noted that a fully in-cell (FIC) touch display panel is a touch screen in which touch sensing elements of the touch screen are disposed inside the array substrate 10 so that the display panel can realize a touch control function. In order to realize a compact structure of the display panel, the FIC may be designed as a structure of a time division common-indium tin oxide (C-ITO). That is, when the display panel realizes a touch function, the first electrode 113 may be used as a touch sensing element for realizing touch sensing; and when the display panel realizes a display function, the first electrode 113 may be used for realizing images display. In the present application, the first electrode 113 is electrically connected to the touch trace 103, so that the touch trace 103 can provide a touch signal to the first electrode 113 to enable the display panel to realize a touch function during a touch period, and the touch trace 103 can provide a common electrode signal to the first electrode to enable the display panel to realize a display function during a display period.

Figure 9:
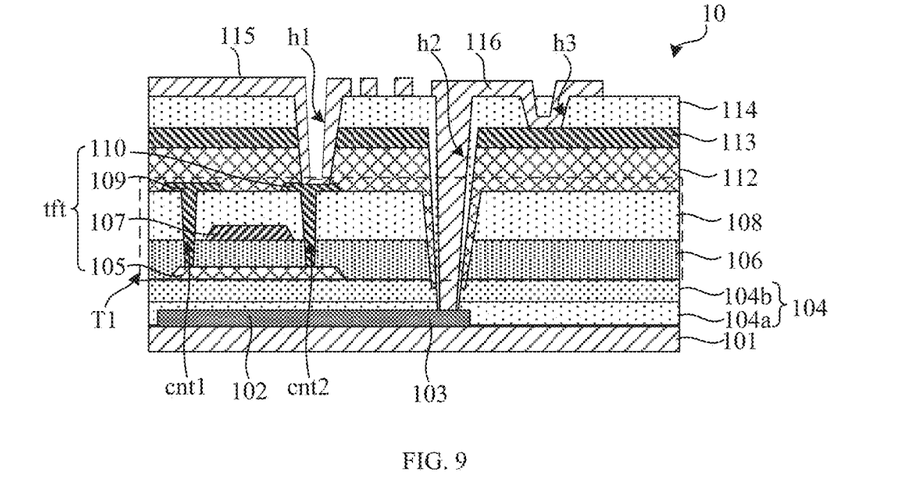
FIG. 9 is a second schematic structural diagram of an array substrate according to an embodiment of the present application.
Figure 10:
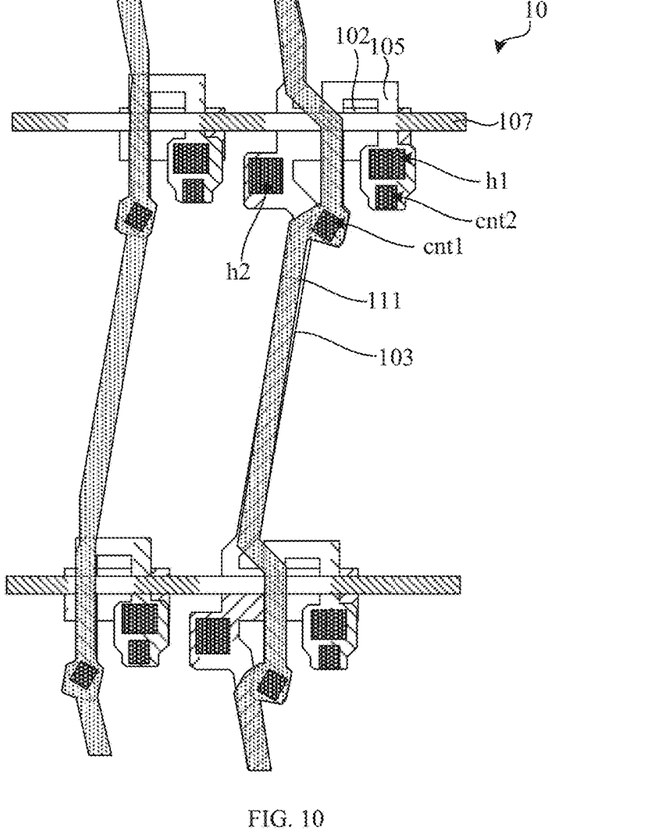
FIG. 10 is a schematic diagram of a second planar structure of an array substrate according to an embodiment of the present application.

References are made to FIG. 9 and FIG. 10, wherein FIG. 9 is a second schematic structural diagram of an array substrate according to an embodiment of the present application, and FIG. 10 is a schematic diagram of a second planar structure of an array substrate according to an embodiment of the present application. The array substrate 10 according to the embodiment of the present application differs from the array substrate 10 shown in FIG. 1 in that the light-shielding layer 102 and the touch trace 103 are connected to each other. In the embodiment of the present application, the light-shielding layer 102 and the touch trace 103 are connected to each other to keep clear from the aperture and further improve the pixel aperture ratio.

In some embodiments, the material of the light-shielding layer 102 is the same as the material of the touch trace 103, and the light-shielding layer 102 and the touch trace 103 may be simultaneously formed through a same yellow process, thereby improving the production efficiency of the array substrate 10 and reducing the production cost of the array substrate 10.

Figure 11:
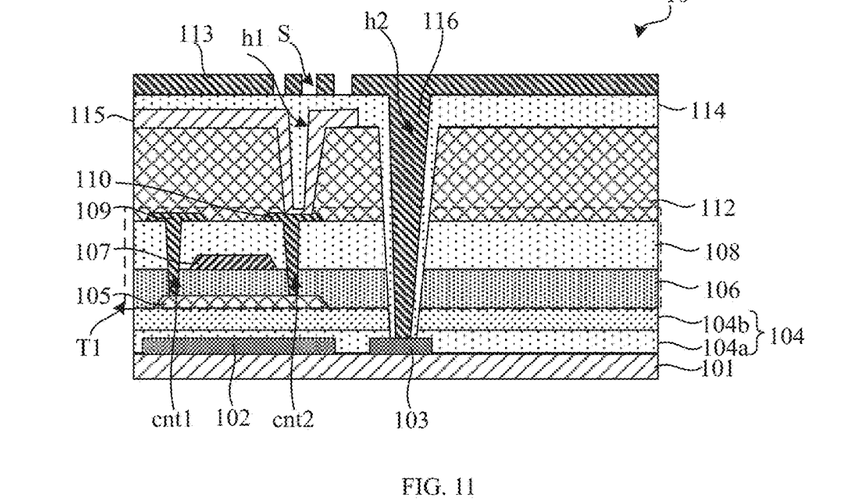
FIG. 11 is a third schematic structural diagram of an array substrate according to an embodiment of the present application.

References are made to FIG. 11, wherein FIG. 11 is a third structural diagram of an array substrate according to an embodiment of the present application. The array substrate provided in the embodiment of the present application differs from the array substrate provided in FIG. 1 in that the second electrode 115 is disposed on a side of the planarization layer 112 away from the thin film transistor structure layer T1. The second electrode 115 is connected to the drain electrode 110 through the first via hole h1. The passivation layer 114 is disposed on the second electrode 115. The first electrode 113 is disposed on the passivation layer 114. The first via hole h1 penetrates through the planarization layer 112, and the second via hole h2 penetrates through the passivation layer 114, the planarization layer 112, and an insulating layer of the thin film transistor structure layer T1. The connection electrode 116 is disposed in the second via hole h2, and is configured to connect the first electrode 113 to the touch trace 103. In the array substrate 10 provided by the present application, the light-shielding layer 102 and the touch trace 103 are disposed on a same layer. Therefore, the touch trace 103 does not need to be disposed in another film layer structure, and the orthographic projection of the data line 111 on the substrate 101 at least partially covers the orthographic projection of touch trace 103 on the substrate 101, which eliminates the influence of the touch trace 103 on the aperture ratio, increases the pixel aperture ratio, and further improves the pixel penetration ratio. Further, the first electrode 113 and the touch trace 103 are connected through the second via hole h2, thereby improving the production efficiency of the array substrate and reducing the production cost.

In some embodiments, the first electrode 113 has a slit S for transmitting light.

Figure 12:
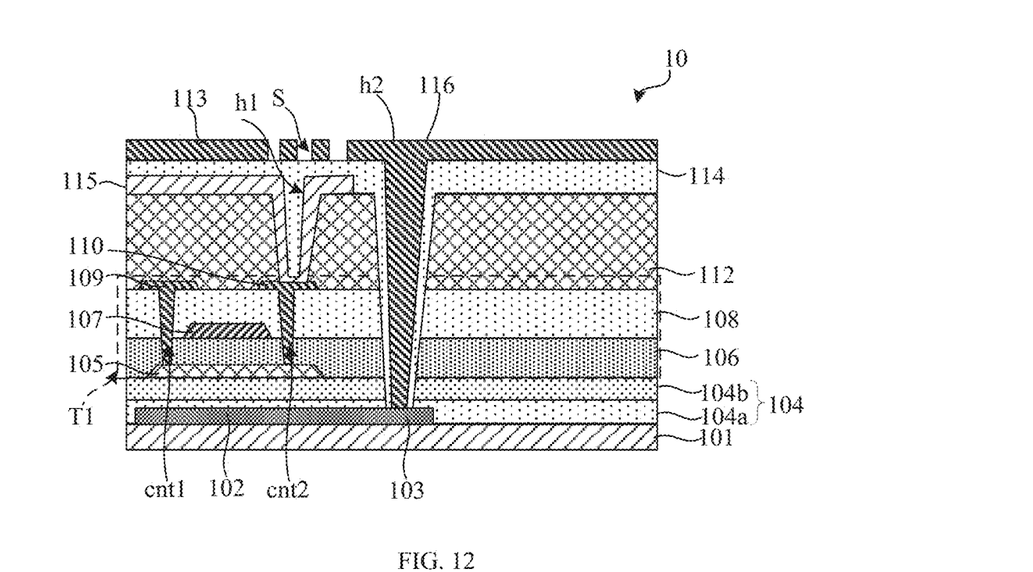
FIG. 12 is a fourth structural diagram of an array substrate according to an embodiment of the present application.

References are made to FIG. 12, wherein FIG. 12 is a fourth structural diagram of an array substrate according to an embodiment of the present application. The array substrate provided in the embodiment of the present application differs from the array substrate provided in FIG. 11 in that the light-shielding layer 102 and the touch trace 103 are connected to each other. In the embodiment of the present application, the light-shielding layer 102 and the touch trace 103 are connected to each other to keep clear from the aperture and further improve the pixel aperture ratio.

Figure 13:
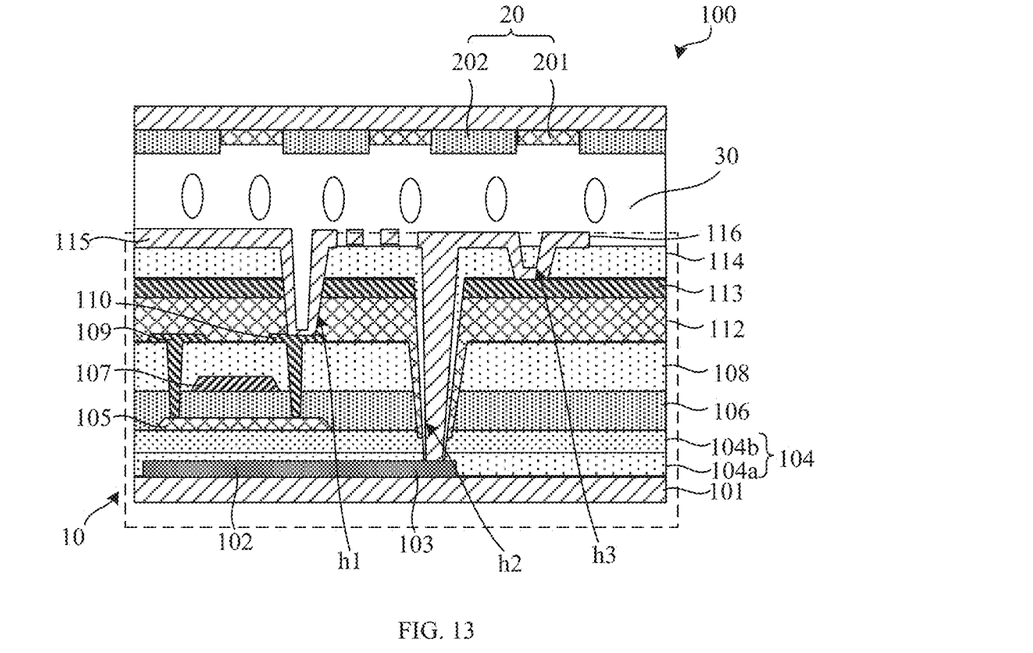
FIG. 13 is a schematic structural diagram of a display panel according to an embodiment of the present application.
Figure 14:
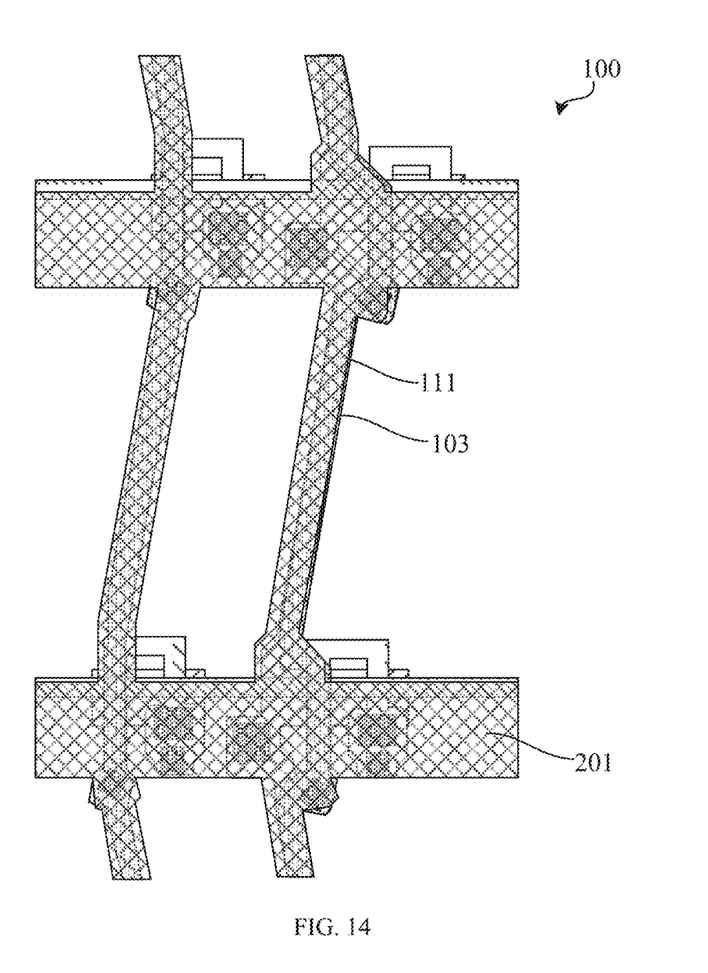
FIG. 14 is a schematic diagram of a planar structure of a display panel according to an embodiment of the present application.

Accordingly, an embodiment of the present application further provides a display panel. References are made to FIG. 13 and FIG. 14, wherein FIG. 13 is a schematic structural diagram of a display panel according to the embodiment of the present application, and FIG. 14 is a schematic diagram of a planar structure of a display panel according to an embodiment of the present application. The display panel 100 includes an array substrate 10, a color film substrate 20, and a liquid crystal layer 30. The color film substrate 20 is disposed on the array substrate 10. The liquid crystal layer 30 is disposed between the array substrate 10 and the color film substrate 20.

In some embodiments, the color film substrate 20 includes a plurality of black matrixes 201, and a plurality of color blocking blocks 202. Each of the color blocking blocks 202 is disposed between adjacent of the black matrices 201. An orthographic projection of the black matrix 201 on the substrate 101 covers an orthographic projection of the touch trace 103 on the substrate 101 and an orthographic projection of the light-shielding layer 102 on the substrate 101.

In the embodiment of the present application, the array substrate 10 includes a substrate 101, a light-shielding layer 102, a touch trace 103, and a data line 111, a first via hole h1 and a second via hole h2. The light-shielding layer 102 is disposed on the substrate 101. The touch trace 103 and the light-shielding layer 102 are disposed on a same layer. The data line 111 and the touch trace 103 are disposed on different layers. The orthographic projection of the data line 111 on the substrate 101 at least partially covers the orthographic projection of the touch trace 103 on the substrate 101. In the display panel 100 provided by the present application, the orthographic projection of the data line 111 on the substrate 101 at least partially covers the orthographic projection of the touch trace 103 on the substrate 101, and the orthographic projection of the black matrix 201 on the substrate 101 covers the orthographic projection of the touch trace 103 on the substrate 10 and the orthographic projection of the light-shielding layer 102 on the substrate 101. Thus, the influence of the touch trace 103 on the aperture ratio is eliminated, the pixel aperture ratio is increased, and the pixel penetration ratio is improved. Line widths of the touch trace 103 and the data line 111 shielded by the black matrix 201 in the direction of the data line 111 are reduced, so that the pixel penetration is increased, thereby improving the luminance efficiency of the display panel 100.

In the embodiment of the present application, references are made to FIG. 13 and FIG. 14, the black matrix 201 blocks the metal traces on the array substrate 10. Since the via holes correspond to the metal traces, the black matrix 201 blocks the first via hole h1 and the second via hole h2, thereby increasing pixel penetration ratio, and improving the luminance efficiency of the display panel 100. It should be noted that the array substrate 10 provided in this embodiment of the present application is any of the above array substrates, and details are not described herein again.

As described above, although the present application has been disclosed with reference to the preferred embodiments, the above preferred embodiments are not intended to limit the present application, and those of ordinary skill in the art may make various changes and modifications without departing from the spirit and scope of the present application, and therefore the scope of protection of the present application is subject to the scope defined by the claims.

What is claimed is:

1. An array substrate, comprising:
   a substrate;
   a light-shielding layer disposed on the substrate;
   a touch trace disposed on the substrate; and
   a data line, wherein the data line and the touch trace are disposed on different layers, and at least one of the data line and the touch trace is disposed on a same layer as the light-shielding layer, wherein an orthographic projection of the data line on the substrate partially covers an orthographic projection of the touch trace on the substrate, and the orthographic projection of the data line on the substrate and the orthographic projection of the touch trace on the substrate are partially staggered;
   wherein the array substrate further comprises:
   a first via hole;
   a second via hole, wherein a width of an aperture of the first via hole is smaller than a width of an aperture of the second via hole;
   a thin film transistor structure layer including a thin film transistor and the data line, wherein the thin film transistor is disposed on the substrate, and the light-shielding layer shields the thin film transistor;
   a planarization layer disposed on a side of the thin film transistor structure layer away from the substrate;
   a first electrode disposed on a side of the planarization layer away from the substrate;
   a connection electrode, wherein the first electrode is connected to the touch trace through the connection electrode;
   a third via hole, wherein the first electrode is disposed on the planarization layer, the thin film transistor includes a source electrode and a drain electrode, wherein the source electrode and the drain electrode are disposed on a same layer as the data line;
   a passivation layer disposed on a side of the first electrode away from the thin film transistor structure layer, wherein the first via hole penetrates through the passivation layer and the planarization layer; the second via hole penetrates through the passivation layer, the planarization layer, and an insulating layer of the thin film transistor structure layer; and the third via hole penetrates through the passivation layer; wherein the connection electrode is disposed on the passivation layer and extends into the second via hole and the third via hole, an end of the connection electrode is connected to the touch trace, and another end of the connection electrode is connected to the first electrode; and
   a second electrode disposed on the passivation layer, wherein the connection layer is disposed on a same layer as the second electrode, and the second electrode is connected to the drain electrode through the first via hole.

2. The array substrate of claim 1, wherein the touch trace is located aside the light-shielding layer, and the light-shielding layer and the touch trace are spaced apart.

3. The array substrate of claim 1, wherein the touch trace is located aside the light-shielding layer, and the light-shielding layer and the touch trace are connected to each other.

4. The array substrate of claim 1, wherein a distance between the data line and the touch trace is greater than or equal to 1 μm at a position where the data line is staggered from the touch trace.

5. The array substrate of claim 1, wherein the thin film transistor comprises a source electrode and a drain electrode disposed on a same layer as the data line, and the array substrate further comprises:
   a second electrode disposed on a side of the planarization layer away from the thin film transistor structure layer, wherein the second electrode is connected to the drain electrode through the first via hole; and
   a passivation layer disposed on the second electrode, wherein the first electrode is disposed on the passivation layer; the first via hole penetrates through the planarization layer; the second via hole penetrates through the passivation layer, the planarization layer, and an insulating layer of the thin film transistor structure layer; the connection electrode is disposed in the second via hole; and the connection electrode is configured to connect the first electrode with the touch trace.

6. The array substrate of claim 5, wherein the first electrode has a slit.

7. The array substrate of claim 1, wherein the data line includes a first trace segment and a second trace segment connected to each other, the first trace segment corresponds between two adjacent sub-pixels, the second trace segment corresponds to the thin film transistor; wherein an orthographic projection of the first trace segment on the substrate partially covers an orthographic projection of the touch trace on the substrate, and an orthographic projection of the second trace segment on the substrate is staggered from an orthographic projection of the touch trace on the substrate at least corresponding to the second via hole.

8. The array substrate of claim 7, wherein the thin film transistor further comprises an active layer, and the orthographic projection of the second trace segment on the substrate partially covers an orthographic projection of the active layer on the substrate.

9. The array substrate of claim 1, wherein the thin film transistor further comprises a gate electrode, and the thin film transistor structure layer further comprises:
 a barrier layer disposed on the light-shielding layer and covering the light-shielding layer and the touch trace, wherein the active layer is disposed on the barrier layer, and an orthographic projection of the active layer on the substrate is located in an orthographic projection of the light-shielding layer on the substrate;
 a gate insulating layer disposed on a side of the active layer away from the substrate, wherein the gate electrode is disposed on a side of the gate insulating layer away from the active layer; and
 an interlayer dielectric layer covering the gate electrode and the gate insulating layer, wherein the interlayer dielectric layer is provided with a first contact hole and a second contact hole; the source electrode, the drain electrode and the data line are disposed on the interlayer dielectric layer; the source electrode is connected to the active layer through the first contact layer; and the drain electrode is connected to the active layer through the second contact hole.

10. The array substrate of claim 1, wherein the first electrode is a common electrode, and the first electrode is multiplexed as a touch electrode.

11. The array substrate of claim 1, wherein a material of the light-shielding layer is same as a material of the touch trace.

12. A display panel, comprising the array substrate of claim 1, wherein the display panel further comprises:
 a color film substrate disposed on the array substrate; and
 a liquid crystal layer disposed between the array substrate and the color film substrate.

13. The display panel of claim 12, wherein the touch trace is located aside the light-shielding layer, and the light-shielding layer and the touch trace are spaced apart.

14. The display panel of claim 12, wherein the touch trace is located aside the light-shielding layer, and the light-shielding layer and the touch trace are connected to each other.

15. The display panel of claim 12, wherein a distance between the data line and the touch trace is greater than or equal to 1 µm at a position where the data line is staggered from the touch trace.

16. The display panel of claim 12, wherein the array substrate comprises a first via hole and a second via hole, and a width of an aperture of the first via hole is smaller than a width of an aperture of the second via hole.

17. The display panel of claim 12, wherein the color film substrate comprises a plurality of black matrixes and a plurality of color blocking blocks, wherein each of the blocking blocks is disposed between adjacent of the black matrixes, wherein an orthographic projection of the black matrix on the substrate covers orthographic projections of the touch trace and the light-shielding layer on the substrate.

18. An array substrate, comprising:
 a substrate;
 a light-shielding layer disposed on the substrate;
 a touch trace disposed on the substrate; and
 a data line, wherein the data line and the touch trace are disposed on different layers, and at least one of the data line and the touch trace is disposed on a same layer as the light-shielding layer, wherein an orthographic projection of the data line on the substrate partially covers an orthographic projection of the touch trace on the substrate, and the orthographic projection of the data line on the substrate and the orthographic projection of the touch trace on the substrate are partially staggered;
wherein the array substrate further comprises:
 a first via hole;
 a second via hole, wherein a width of an aperture of the first via hole is smaller than a width of an aperture of the second via hole;
 a thin film transistor structure layer including a thin film transistor and the data line, wherein the thin film transistor is disposed on the substrate, and the light-shielding layer shields the thin film transistor;
 a planarization layer disposed on a side of the thin film transistor structure layer away from the substrate;
 a first electrode disposed on a side of the planarization layer away from the substrate; and
 a connection electrode, wherein the first electrode is connected to the touch trace through the connection electrode;
wherein the thin film transistor comprises a source electrode and a drain electrode disposed on a same layer as the data line, and the array substrate further comprises:
 a second electrode disposed on a side of the planarization layer away from the thin film transistor structure layer, wherein the second electrode is connected to the drain electrode through the first via hole; and
 a passivation layer disposed on the second electrode, wherein the first electrode is disposed on the passivation layer; the first via hole penetrates through the planarization layer; the second via hole penetrates through the passivation layer, the planarization layer, and an insulating layer of the thin film transistor structure layer; the connection electrode is disposed in the second via hole; and the connection electrode is configured to connect the first electrode with the touch trace.

19. The array substrate of claim 18, wherein the touch trace is located aside the light-shielding layer, and the light-shielding layer and the touch trace are spaced apart.

20. The array substrate of claim 18, wherein the touch trace is located aside the light-shielding layer, and the light-shielding layer and the touch trace are connected to each other.

* * * * *